United States Patent [19]

Salisbury

[11] Patent Number: 4,618,470
[45] Date of Patent: Oct. 21, 1986

[54] MAGNETIC CONFINEMENT NUCLEAR ENERGY GENERATOR

[75] Inventor: Winfield W. Salisbury, Scottsdale, Ariz.

[73] Assignee: Austin N. Stanton, Dallas, Tex. ; a part interest

[21] Appl. No.: 445,934

[22] Filed: Dec. 1, 1982

[51] Int. Cl.⁴ .............................................. G21B 1/00
[52] U.S. Cl. ................................ 376/123; 376/121; 376/140; 376/127; 376/146
[58] Field of Search ............... 376/121, 123, 140, 150, 376/149, 100, 107, 146, 127

[56] References Cited

U.S. PATENT DOCUMENTS 3,120,475  2/1964  Bennett ............................. 376/140
4,189,346  2/1980  Jarnagin ............................. 376/107
4,202,725  5/1980  Jarnagin ............................. 376/107

Primary Examiner—Harvey E. Behrend
Attorney, Agent, or Firm—Richards, Harris, Medlock & Andrews

[57] ABSTRACT

A fusion reactor (10) includes a sphere (12). Structure (20) is disposed within the interior of the sphere (12) for producing a magnetic field. Structure (24, 26) is circumferentially disposed around the exterior of the sphere (12) for producing a countermagnetic field. Structure (28, 32, 38, 46a) is provided for injecting a gas containing fusible ions into the sphere (12). Structure (30, 32, 38, 46) is also provided for heating the gas within the interior of the sphere (12). Structure (62, 64, 66, 68) is provided for extracting heat from the sphere (12).

3 Claims, 5 Drawing Figures

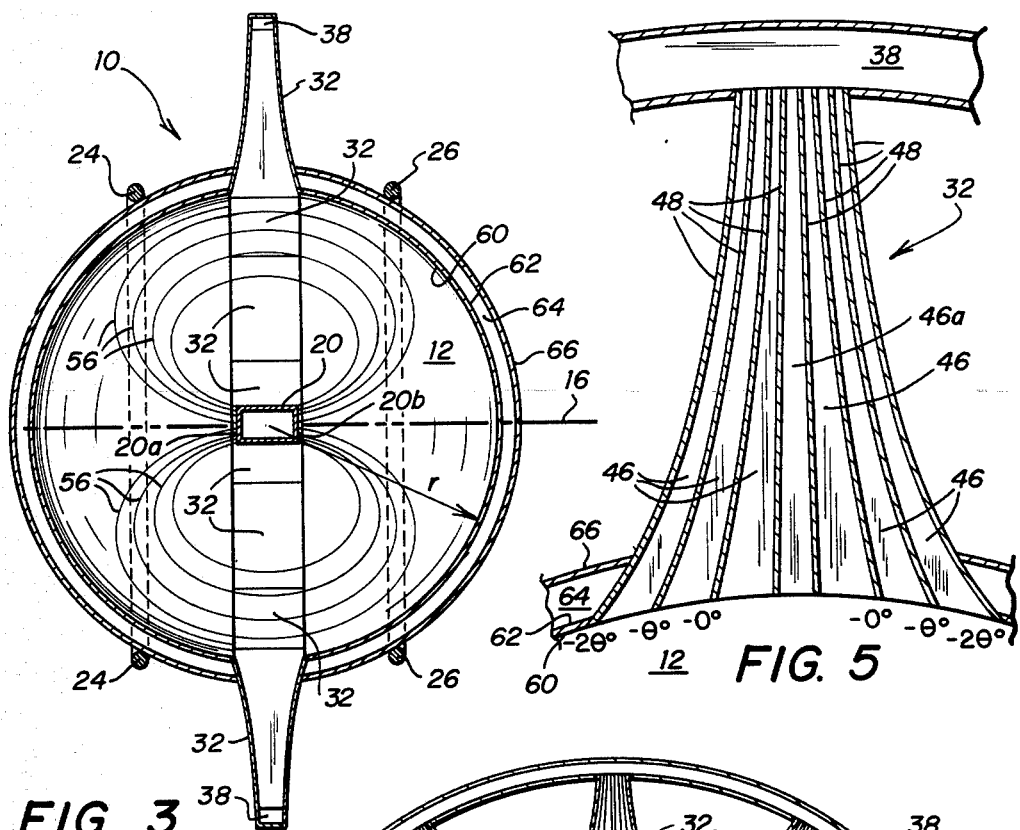
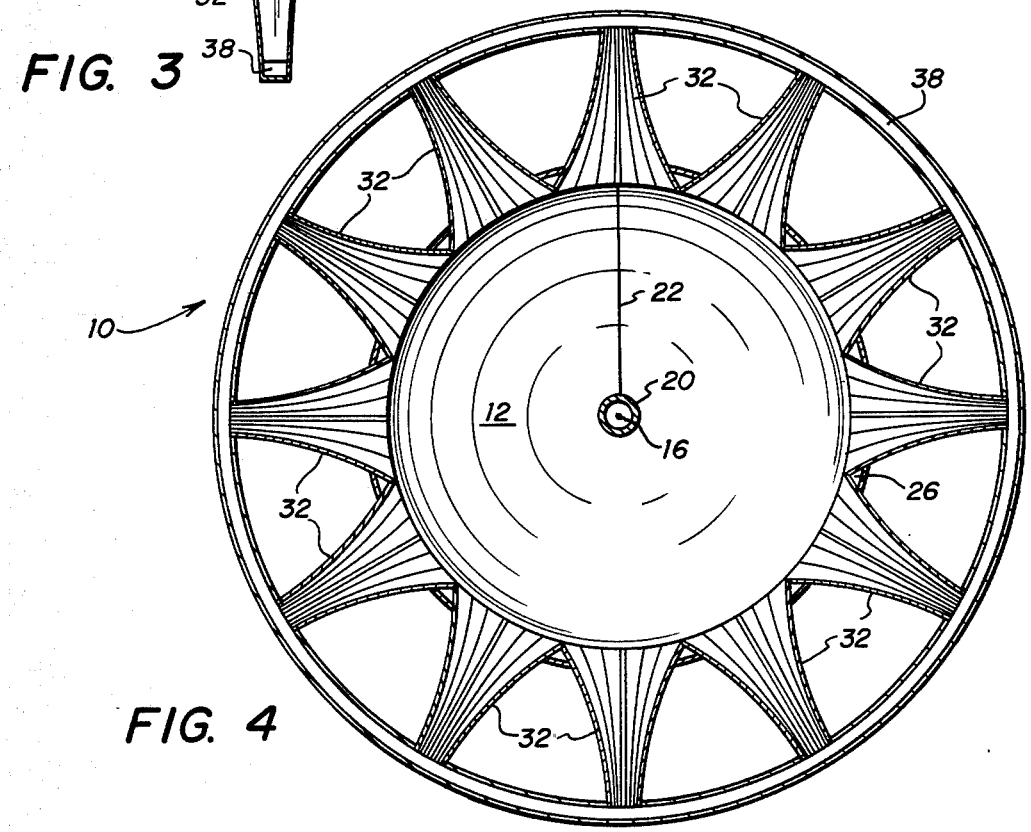

MAGNETIC CONFINEMENT NUCLEAR ENERGY GENERATOR

TECHNICAL FIELD

This invention relates to the generation of energy from the fusion of atomic nuclei, and more particularly to a magnetic confinement nuclear energy generator.

BACKGROUND ART

It is known that individual nuclear particles are so constituted as to permit fusing of the lighter nuclei. Fusion of lighter nuclei is accompanied by release of energy. Of particular interest, is any fusion reaction in which power can be produced in quantities greater than the power consumed in establishing and maintaining the reaction. There are over thirty reactions now known to be possible. The most appealing reactions are those which involve the heavy hydrogen isotopes, deuterium and tritium, because they tend to have the largest fusion reaction cross section at the lowest energies. Many possible reactions are well known. For example, *Van Norstrand's Scientific Encyclopedia*, Fifth Edition, Reinhold Company, New York, N.Y., 1976, at page 1656, et seq., discusses various aspects of the possibilities for producing a net gain in power from fusion reactions and briefly describes some of the attempts to perform such reactions with a net power gain.

Plasma research has received concentrated attention, but the formidable task of plasma containment has yet to be solved. In avoidance of the problems of containment, a more recent approach involves laser-induced fusion. In its simplest form a focused energetic laser beam is brought to bear on a small deuterium-tritium pellet for heating to fusion temperatures. Efforts on this and on other fronts such as those involving containment have been steady in response to high incentives.

Thus, while many of the possibilities have long been known and have been widely attacked through various approaches towards achieving net power gain from fusion, the challenge remains unsatisfied.

A central problem of deuterium fusion for power production is that of raising a small mass of ionized deuterium or a mixture of deuterium and tritium to the necessary reaction temperature while maintaining the density of the plasma and temperature long enough for a sufficient portion of the hot ionized gas to proceed with a nuclear reaction. The necessary temperature required is of the order of $10^8 K°$, such that no solid state matter can maintain mechanical integrity while in close contact with the reaction. It is therefore necessary to either confine the reacting plasma with a magnetic field or to pulse the reaction so rapidly that inertial forces from rapidly moving high temperature gases can be used to provide the confinement forces for the short time necessary.

Magnetic confinement of the reacting plasma has been attempted in many forms. Such previously developed forms have suffered from instabilities which have allowed the hot plasma to leak through the confining fields too rapidly. A deficiency in prior systems is the amount of thermodynamic equilibrium time required because heat is frequently introduced by heating the electrons of the plasma. If the plasma is thin, the thermodynamic equilibrium time necessary for the positive ionic temperature to equal the electron temperature where the reaction can occur is too long compared to the stability time. The particle leak rate of the magnetic confinement system must also permit a confinement time longer than the instability or the electron-ion thermodynamic equilibrium time.

Several factors of a magnetic confinement system are important for allowing the required reaction time and plasma density to be reached. These factors include the field strength and gradient of the magnetic field, the particle density and density gradient of the plasma and the stability time of the plasma confinement. All these factors interact and influence the confinement time.

A need has thus developed for a fusion reactor which greatly extends confinement time and increases the effectiveness of the other factors involved in nuclear fusion utilizing a confinement system which will provide long confinement time. Such a natural system is the Van Allen belts of radiation around the earth. In these belts an ion plasma of sufficient temperature to sustain deuterium-deuterium fusion is confined by a small magnetic field with a relaxation time of many months. The Van Allen belts of radiation are created by charged particles reflected in a north-south oscillation by "magnetic mirrors" formed by the increasing intensity of the magnetic fields in the higher latitudes of the earth. This natural system of magnetic mirrors makes use of fields on the outside of the earth's "magnet".

A need has thus arisen for a fusion reactor utilizing a magnetic confinement system of magnetic mirrors with the "natural" geometry reproduced on a realizable scale to increase plasma density without a detrimental reduction in stability time. A need has further arisen for such a magnetic system in which provision is made for an input of heating energy to raise the temperature of the plasma to the required reaction temperature.

DISCLOSURE OF THE INVENTION

In accordance with the present invention, a nuclear fusion generator is provided in which a magnetic confinement system is utilized which substantially eliminates the problems heretofore associated with fusion reactors.

In accordance with the present invention, a fusion reactor is provided. The reactor includes a sphere. Structure is disposed within the interior of the sphere for producing a first magnetic field. Structure is disposed circumferentially around the exterior of the sphere for producing a second magnetic field which is antiparallel to the first magnetic field. Structure is provided for injecting a gas containing fusible ions into the interior of the sphere. The reactor further includes structure for heating the gas within the interior of the sphere to promote collisions between ions within the sphere. Structure is responsive to the energy produced from the ion collisions within the sphere.

In accordance with another aspect of the present invention, a fusion reactor includes a sphere. A superconducting coil is disposed within the sphere for producing a high magnetic field within the sphere. A pair of Helmholtz coils are disposed circumferentially around the exterior of the sphere for producing a second magnetic field which is antiparallel to the magnetic field produced by the superconducting coil. Structure is provided for injecting a gas containing fusible ions into the sphere. A microwave power supply is provided for heating the gas within the interior of the sphere to promote collision between the ions within the sphere. Structure is further provided which is responsive to the energy produced from the ion collisions within the sphere.

BRIEF DESCRIPTION OF THE DRAWINGS

For a more complete understanding of the present invention and for further advantages thereof, reference is now made to the following Detailed Description, taken in conjunction with the accompanying Drawings in which:

FIG. 3 is a sectional view taken generally along sectional lines 3—3 of FIG. 2 illustrating the interior of the present reactor and includes typical lines of magnetic force and the plasma flow through the superconducting coil of the present invention;

FIG. 4 is a sectional view taken generally along sectional lines 4—4 of FIG. 2 illustrating the interior of the present reactor; and FIG. 5 is an enlarged diagrammatic illustration of the wave guide and a horn of the present invention illustrating their various septa and subdivisions together with the phase angles of waves within the subdivisions.

DETAILED DESCRIPTION

Figure 1:
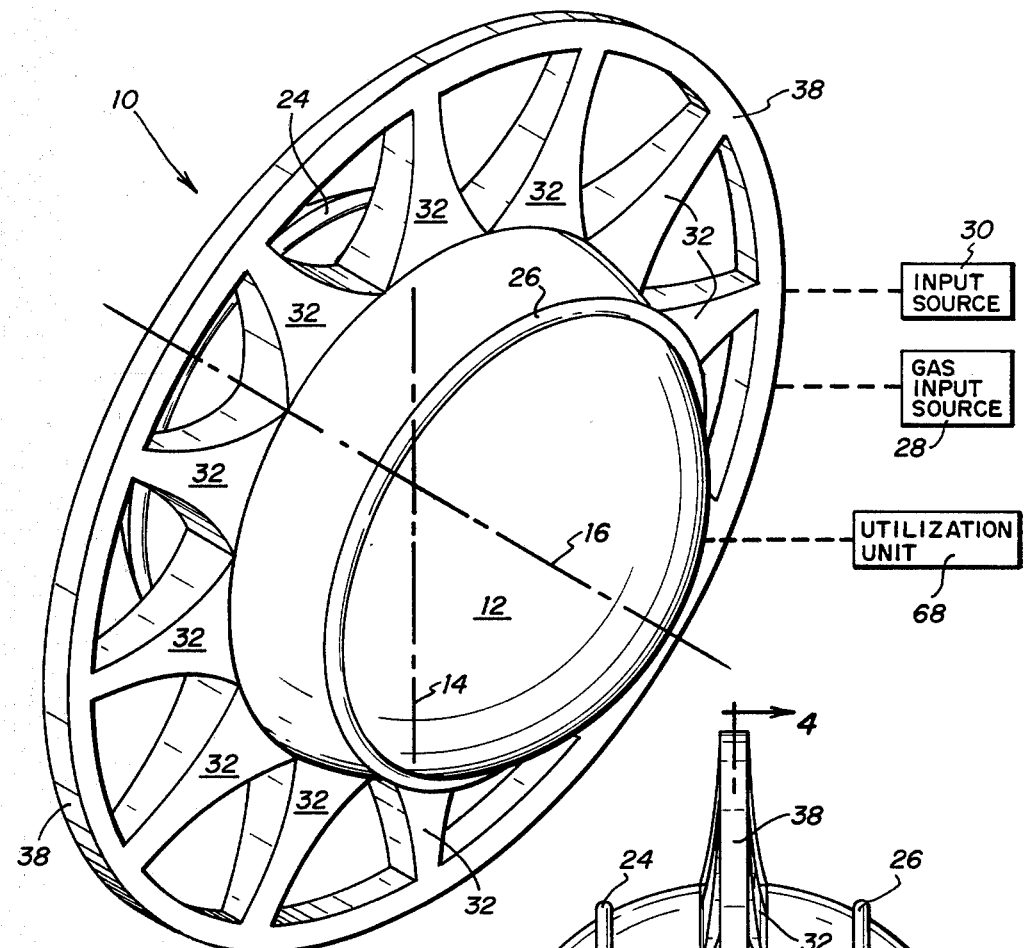
FIG. 1 is a perspective diagrammatical illustration of the present reactor.
Figure 2:
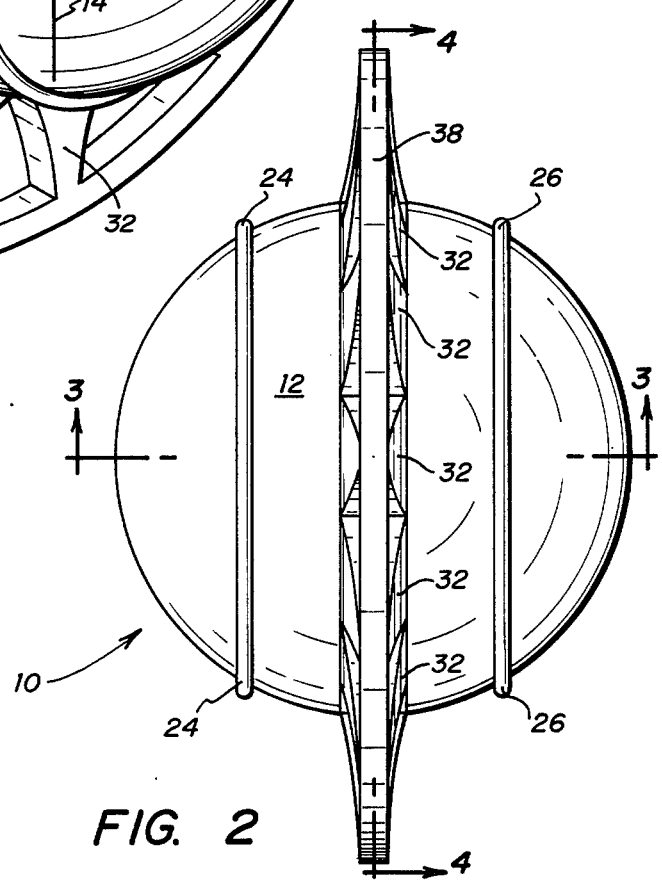
FIG. 2 is a side diagrammatic illustration of the present reactor shown in FIG. 1.

Referring simultaneously to FIGS. 1-4, a diagrammatic illustration of the present fusion reactor, generally identified by the numeral 10, is illustrated. Reactor 10 comprises a sphere 12 having an equator 14 and a magnetic axis 16. Sphere 12 has a radius, r (FIG. 3), of approximately, for example, one meter. A magnetic field is produced within sphere 12 utilizing a superconducting coil 20 which is suspended at the center of sphere 12 by superconducting leads 22 (FIG. 4). Magnetic axis 16 represents the axis of the system of the present invention whereas the equator 14 is defined as the perimeter of the mid-plane perpendicular to the magnetic axis 16 of superconducting coil 20.

A pair of Helmholtz coils 24 and 26 are disposed circumferentially around the exterior of sphere 12 to produce a magnetic field antiparallel to the magnetic field produced inside sphere 12 by superconducting coil 20. The field produced by Helmholtz coils 24 and 26 increases the magnetic field in the outer regions near equator 14 of sphere 12 and ensures a uniform field in the region of equator 14.

A gas containing fusible ions such as deuterium or a mixture of deuterium and tritium is introduced into sphere 12 from an input source 28 (FIG. 1) through input horns 32 which are circumferentially disposed around axis 16 of sphere 12. The gas within sphere 12 is heated utilizing an input source 30 which supplies microwave power to a wave guide 38. Wave guide 38 is interconnected to horns 32.

FIG. 5 illustrates one horn 32. The aperture of each horn 32 is divided into an odd number of sections 46 across the direction at right angles to equator 14. Septa 48 separate sections 46. Central section 46a of horn 32 is interconnected via wave guide 38 to input source 28 for receiving a gas supply of nuclear fusible fuel gas such as, for example, deuterium or a mixture of deuterium and tritium. The remaining sections 46 of horn 32 are interconnected via wave guide 38 to input source 30 to receive microwave power which functions to heat and ionize the gas within sphere 12 thereby creating a hot plasma. The microwave power from input source 30 for plasma heating can be produced from standard power sources of 80% efficiency.

The sections 46 of horn 32 on either side of section 46a allow for a variation of phase of microwave power from input source 30 across the aperture of horn 32. FIG. 5 illustrates septa 48 separating sections 46 of horn 32 having phase angles of 0°, $\theta°$ and $2\theta°$ on one side of equator 14 and 0°, $-\theta°$ and $-2\theta°$ on the other side of equator 14. This variation in phase of the microwave power is along the direction of the stationary magnetic field lines of superconducting coil 20 in the region of the plasma excitation.

As shown in FIG. 3, the plasma variation produces a magnetic wave which sweeps plasma 56 away from the mid-plane and along the static magnetic field flux lines produced by superconducting coil 20 towards the cusps 20a and 20b of superconducting coil 20. This action causes an increase in the component of the kinetic energy of the plasma within sphere 12 parallel to the magnetic flux relative to the component perpendicular. This action further allows a mirror ratio in the magnetic field to approach the limit imposed by the ratio of the high magnetic field at cusps 20a and 20b to the low magnetic field in the region of the microwave excitation of, for example, approximately 400 kgauss. Because cusps 20a and 20b are "back to back" the plasma leakage at these magnetic mirrors is eventually recovered by return to the main stream 56.

Referring again to FIG. 3, the main magnetic field produced by superconducting coil 20 will guide electrons and ions along the magnetic flux lines towards the cusps 20a and 20b at the ends of super-conducting coil 20. The components of the random thermal velocities of the electrons and ions which lie along the flux lines will cause plasma 56 to flow into the magnetic cusp region 20a and 20b from all other parts of the plasma within sphere 12. This flow will produce an increase of pressure at the magnetic cusp 20a and 20b. This flow will also cause the reversal of the velocity components due to reflection at cusps 20a and 20b. Thus the pressure and corresponding velocity will be higher at the cusps 20a and 20b within sphere 12. A sufficient input of microwave heating energy from input source 30 at the lowest density part of the gas volume will power this compression which builds up to the limit imposed by the magnetic pressure at cusps 20a and 20b.

Referring to FIGS. 3 and 5, the energy produced due to the fusion reactions taking place in reactor 10 is extracted from the interior surface 60 of sphere 12. The exterior surface 62 of sphere 12 is provided with a lining 64 of carbon, such as, for example, pyrolitic carbon. A suitable heat exchange jacket 66 surrounds the exterior of sphere 12. Exchange jacket 66 is connected to a utilization unit 68 (FIG. 1).

The present reactor 10 produces directed kinetic energy supplied by the moving magnetic wave to plasma 56 at the region of lowest pressure and density and provides dynamic adiabatic compression at the magnetic cusps 20a and 20b to produce a density and temperature sufficient to produce nuclear fusion in the region of the magnetic cusps 20a and 20b on each end of superconducting coil 20. It can be shown that fusion takes place within reactor 10 and that the product of the estimated particle density and the confinement time will be expected to be greater than the Lawson criterion for the relevant system efficiency, ion mixture and ion energy.

Assume the Lawson criteria for a deuterium-tritium ion mixture with energies of 10 kev to 20 kev and 40% efficiency to be $4 \times 10^{13}$ sec/cc. It will also be assumed that in the present reactor 10, the magnetic field in the reaction region will be 400 kilogauss. The maximum kinetic pressure will equal the confinement pressure of the magnetic field as follows:

$$p_{max} = B^2/8\pi \quad (1)$$

and since B=400 kilogauss, it can be seen that:

$$p_{max} = 6.4 \times 10^9 \text{ dynes/cm}^2 = 6.4 \times 10^9 \text{ ergs/cc}. \quad (2)$$

If the particles have an energy of 10 kev or $1.6 \times 10^{-8}$ ergs, the number of particles given by $p_{max}$ is:

$$6.4 \times 10^9 / 1.6 \times 10^{-8} = 4.0 \times 10^{17} \text{ particles/cc}. \quad (3)$$

To find the confinement time, an estimate is made based on the expression for the confinement time for the cusp configuration of a magnetic mirror. This time may be expected to be smaller than the time for the geometry for the present reactor 10. For the cusp geometry the confinement time is:

$$t_{sec} = R_{cm}^2 \, B_{gauss} \times 10^{-10} / T_{kev} \quad (4)$$

where $R_{cm}$ is the radius of the cusp in centimeters, B is the magnetic field in gauss and T is the kinetic energy of the particles in kev.

Based upon superconducting coil 20 having a radius of 5 centimeters and a length of 10 centimeters, and a magnetic flux of 400 kgauss, upon substituting these parameters into Equation (4) it can be seen that $t_{sec} = 10^{-2}$ seconds. Therefore the product of the maximum number of particles per cubic centimeter and the estimated confinement time is:

$$4 \times 10^{17} \text{ particles/cc} \times 10^{-2} \text{ sec} = 4 \times 10^{15} \quad (5)$$

which is to be compared with the Lawson criteria which is $4 \times 10^{13}$. Therefore the product of the maximum number of fusible particles per cubic centimeter and the confinement time estimated for the present reactor will fulfill the Lawson criteria.

It therefore can be seen that the present invention provides for a fusion reactor for power production utilizing a magnetic confinement system in which the reaction temperature and plasma density can be maintained for a sufficient time period such that the ionized gas can proceed with a nuclear reaction.

Whereas the present invention has been described with respect to specific embodiments thereof, it will be understood that various changes and modifications will be suggested to one skilled in the art and it is intended to encompass such changes and modifications as fall within the scope of the appended claims.

I claim:

1. A fusion reactor comprising:
    a sphere defining an inner surface and having a center;
    superconducting coil means disposed substantially at the center of said sphere for producing a first magnetic field centered within said sphere;
    coil means disposed circumferentially around said sphere for producing a second magnetic field;
    means for injecting a gas containing fusible ions into said sphere;
    said first and second magnetic fields defining cusps adjacent said superconducting coil means to form back-to-back magnetic mirrors for containing and compressing said ions;
    means for heating said gas within the interior of said sphere to permit collisions between ions within said sphere; and
    means disposed adjacent said inner surface of said sphere responsive to energy produced from said ion collisions.

2. The reactor of claim 1 wherein said second magnetic field is antiparallel to said first magnetic field.

3. The reactor of claim 2 wherein said means for heating said gas within the interior of said sphere comprises:
    a source of microwave energy; and
    means for interconnecting said source of microwave energy to the interior of said sphere.

* * * * *